Figure 1:
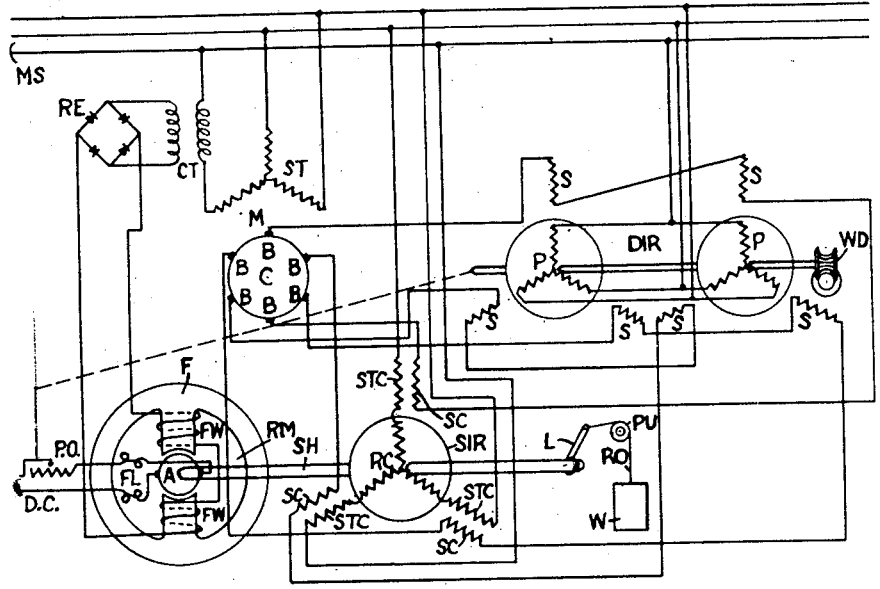

Inventor
Benno Schwarz

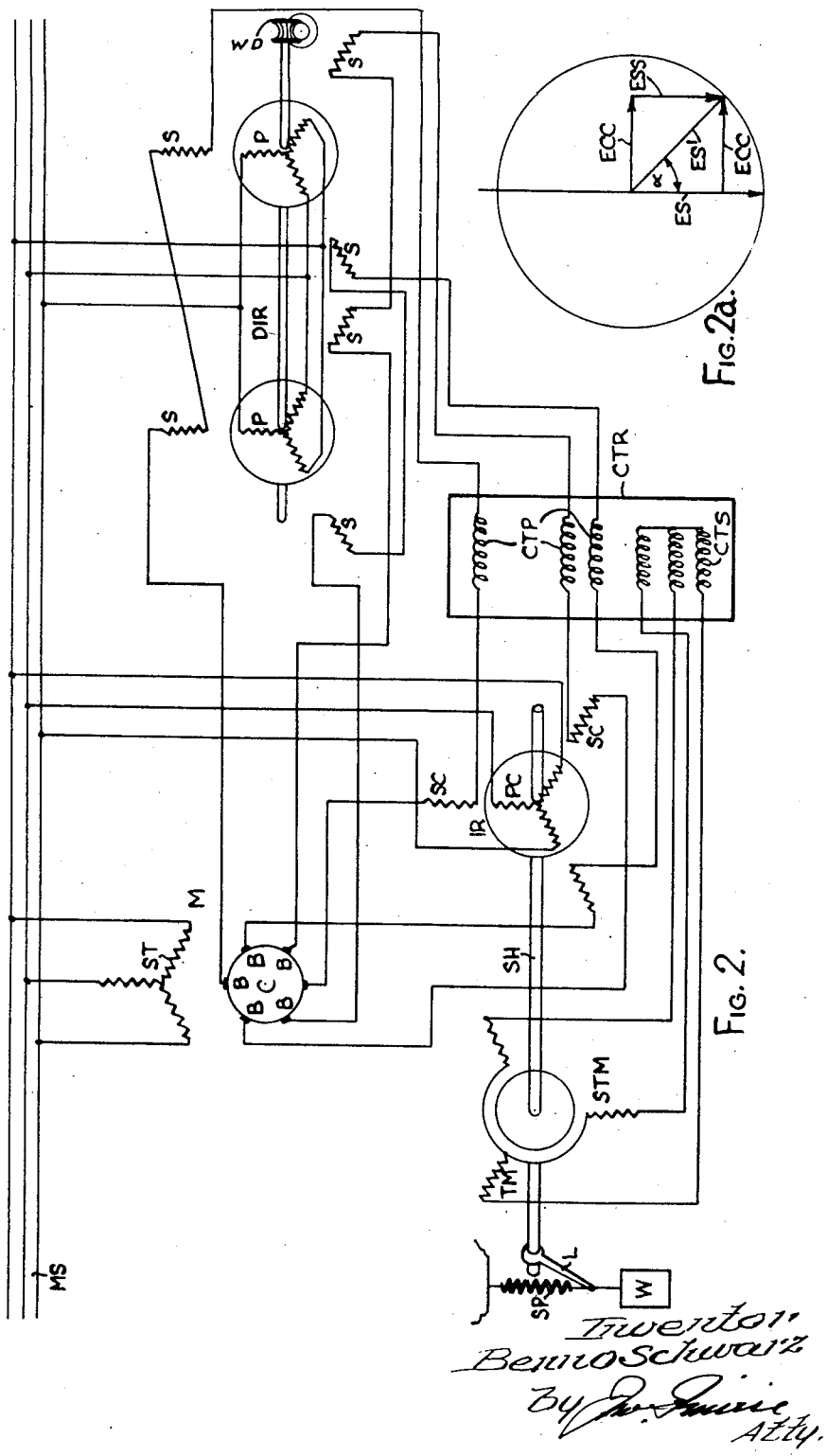

Patented Nov. 29, 1949

2,489,982

UNITED STATES PATENT OFFICE 2,489,982

COMPENSATING MEANS OR ARRANGEMENTS FOR ALTERNATING CURRENT COMMUTATOR MACHINES

Benno Schwarz, Norwich, England

Application March 8, 1948, Serial No. 13,706
In Great Britain March 10, 1947

13 Claims. (Cl. 318—244)

The invention relates to compensating means or arrangements for A. C. commutator machines.

In such machines, in particular stator fed machines with voltage regulation in the rotor circuit, provision is generally made for introducing a leading voltage component into the rotor circuit in order to counteract the reactive voltage drop due to the load current.

This measure, besides improving the power factor of the current taken from the supply, is adapted in order to obtain a higher overload capacity, a reduction of the commutator load current and its losses, and to a lesser degree also in order to reduce the speed changes due to load variations in the case of the operation of a commutator machine as a shunt motor.

This leading compensating voltage is in general produced by an additional winding which is introduced in the rotor circuit and is either arranged in the stator of the commutator machine or forms a secondary winding of a special compensating transformer.

There are also known arrangements in which the compensating voltage is produced by an induction regulator or other speed regulating transformer, sometimes in combination with windings in the motor, or in combination with brush adjusting means for the motor.

The usual arrangement produces a compensating voltage which has a fixed value for any adjustment of the variable voltage introduced into the rotor circuit for speed adjusting purposes in the case of motoring operation and load adjusting purposes in the case of generative operation.

In the motoring operation, such constant compensating voltage, of a value selected to obtain the lowest possible full load current or thereabouts, in the rotor circuit, results in a substantial leading magnetising current at no load of the machine. This leading magnetising current reaches a comparatively high value especially in machines of large size where the ohmic resistance in the rotor circuit is low in comparison with the reactance of the circuit.

Frequently this leading magnetising current is of higher value than that of the full load current, and operation of the machine at no load is not possible at all without special means for reducing said leading magnetising current, as for instance resistances.

Apart from the magnitude of the leading magnetising current, its effect on the speed regulation between full load and no load is very pronounced by reason of the speed increasing effect of the reactive voltage drop due to a leading current in the rotor circuit.

In the generative operation, which is frequently required with a commutator machine working operationally as a motor as for instance during periods of regenerative braking, the leading magnetising current is still further increased if no measures are taken to reduce the effect of the leading compensating voltage.

The present invention is concerned with arrangements for producing and introducing into one of the circuits of an A. C. commutator machine, a variable compensating voltage, the value of which is dependent upon the load of the commutator machine.

The present invention comprises an automatic control arrangement for an A. C. commutator machine, embodying an induction regulator or other variable voltage transformer having a secondary winding which is introduced into the rotor circuit of the commutator machine and produces a variable phase-shifting voltage which is dependent in magnitude on the adjustment of the induction regulator or other variable voltage transformer, such adjustment being made dependent on the interaction of at least two torques or forces, of which at least one is dependent on one or more of the load currents of the commutator machine.

Thus, the adjustment of the induction regulator or other variable voltage transformer may be made a functition of the load-dependent current in one of the circuits of the commutator machine by an interaction of two torques acting on said variable voltage transformer, one being made dependent on the magnitude of the load dependent current in one or more of the circuits of the commutator machine and the other being the inherent torque produced by the variable voltage transformer itself, or a mechanically produced torque dependent upon the attained position of the adjustable unit of said variable voltage transformer.

Where the variable voltage transformer has an inherent torque this may be combined with the aforesaid mechanically produced torque.

The variable compensating voltage produced by the arrangement according to the invention can also contain a voltage component vectorially at right angles to the compensating voltage, thereby simultaneously introducing a speed adjustment of the machine in motoring, dependent on the load.

This effect can be utilized either to reduce or eliminate, or even to over-compensate the natural speed regulation due to load variation of an A. C. commutator motor, or alternatively to increase the speed regulation. In the former case an ideal "shunt" characteristic can, for instance, be obtained. In the latter case "compounding" of the machine is possible, for instance for the utilization of a fly-wheel effect.

In the drawings:

Figure 1 illustrates, by way of example, one arrangement according to the invention in which a single induction regulator is utilized as a variable voltage compensating transformer, and in which the load dependent current in the stator circuit of the commutator machine is measured for the purpose of obtaining a torque proportional to it in a D. C. excited rotary magnet coupled to the compensating induction regulator.

Figure 1A:
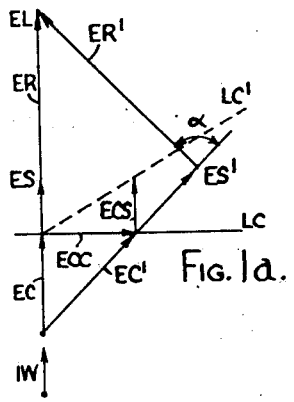

Figure 1a is a voltage vector diagram illustrative of the functioning of the arrangement shown in Figure 1.

Figure 1B:
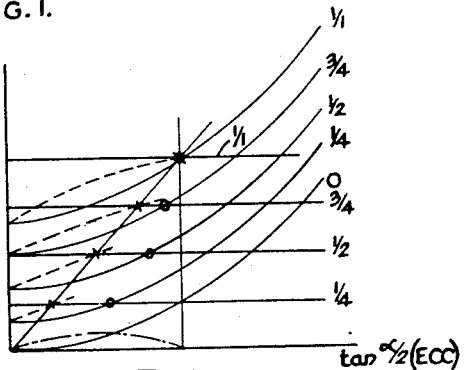

Figure 1b exemplifies a typical torque characteristic of the arrangement shown in Figure 1 for different operating conditions of the A. C. commutator machine.

Figure 1C:
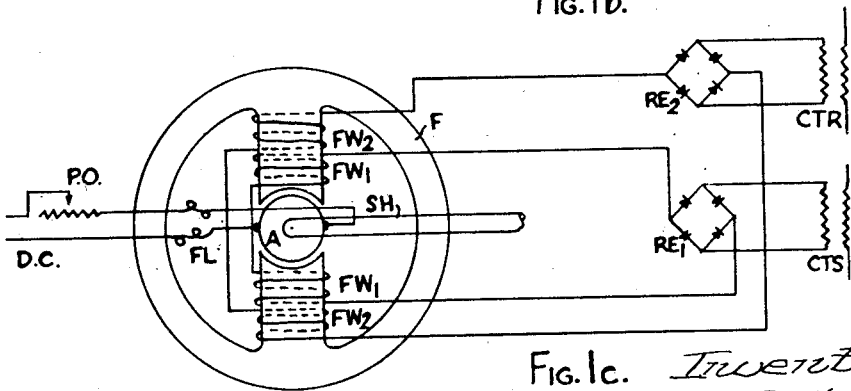

Figure 1c illustrates an alternative arrangement for the excitation of the rotary magnet shown in Figure 1.

Figure 2 shows another example of an arrangement according to the invention in which a conventional single induction regulator is used as a variable voltage compensating transformer in combination with a 3-phase A. C. torque motor, the torque of which is proportional to the load dependent rotor current of the A. C. commutator machine.

Figure 2a is a voltage vector diagram illustrative of the functioning of the arrangement shown in Figure 2.

In Figure 1 M represents a stator fed variable speed commutator motor, having a stator winding ST which is connected to the supply MS, and a commutator C to which the rotor winding is connected. The commutator brushes B are fed with a variable voltage to obtain speed variation of the motor.

The variable voltage required for this purpose is obtained from a double induction regulator DIR, operable by any suitable means illustrated diagrammatically as a worm and worm wheel WD. This double induction regulator DIR has primary windings P which are connected to the supply MS in the usual way and secondary windings S which are connected to the commutator brushes B of the motor M.

Adjustment of the induction regulator DIR results in the variation of its secondary voltage produced in its secondary windings S and in this way speed adjustment of the motor M is obtained apart from the secondary effects with which this invention is concerned.

SIR is a single induction regulator having a stator winding STC and a rotor winding RC.

The stator winding STC has its three open phases connected at one end to the supply mains MS and at the other end to the rotor winding RC.

In order to obtain the required phase position of the rotor current in line with the explanation given above, a secondary winding SC is provided for the single induction regulator SIR and this secondary winding SC is connected in the rotor circuit of the motor M in place of the usual compensating winding producing a fixed leading compensating voltage.

The secondary winding SC is accommodated in the same winding slots of the stator core as those for the stator winding STC of the single induction regulator SIR.

The single induction regulator SIR is mechanically coupled by a shaft SH with a D. C. excited rotary electromagnetic unit RM, which, in the present example, consists of a 2-pole stationary field system F and a wound armature A the winding of which is connected through flexibles FL to a constant D. C. source of supply through an adjustable resistance PO.

The field system F is excited by a field winding FW which is fed from the rectifier RE. The rectifier RE is fed in bridge connection from a current transformer CT which is connected in the circuit of the stator winding ST of the commutator motor M, so that a torque opposed to the inherent torque of the induction regulator SIR, and dependent on the load current of the motor M, will be exercised on the shaft SH by the rotary electromagnetic unit RM.

In the example shown in Figure 1, a mechanical assembly is also provided for exercising another torque on the shaft SH in a direction to assist the torque of the induction regulator SIR for a purpose hereinafter described.

This mechanical assembly is schematically shown as comprising a lever L secured on the shaft SH, a rope, cable or the like RO attached to the end of the lever and looped over a pulley PU, and a weight W attached to the depending end of the rope RO, the lever L thus tending to turn the shaft SH under the action of the weight W.

In order to explain the function of the described arrangement reference is made to the voltage vector diagram Figure 1a and the torque characteristic Figure 1b.

In the vector diagram Figure 1a, the vertical axis coincides with the vectorial position of the motor rotor voltage between two opposite brushes B of the commutator C in Figure 1.

In order to obtain speed variation of the motor M a voltage has to be introduced into its rotor circuit, the vector position of which voltage is the same as that of the rotor voltage, or opposite to it, depending on whether an adjustment above or below synchronous speed is desired.

An adjustable voltage of this description is produced by the double induction regulator DIR in Figure 1.

This voltage as such is not shown in the voltage vector diagram Figure 1a as its magnitude does not basically affect the function of the arrangement.

It is to be assumed with regard to the vector diagram Figure 1a that the line voltage EL for one phase, that means between one line and the neutral, coincides with the rotor voltage in phase position, so that EL falls on the vertical axis.

Assuming that the stator winding STC and the rotor winding RC of the single induction regulator SIR have the same number of turns, the two voltages ES and ER will be equal and their vectorial sum will balance the line voltage.

In the position of the rotor of the single induction regulator SIR, where, as diagrammatically shown in Figure 1, the winding phases in the stator and rotor of said induction regulator are co-axial, the voltage vectors ES and ER have the same position and add together algebraically as shown in Figure 1a.

If the rotor of the single induction regulator SIR is adjusted so that it is displaced by the angle α from its co-axial position, the rotor and stator voltage vectors then have the value and position represented by the vectors ER' and ES' in Figure 1a.

The voltage in the stator secondary winding SC of the induction regulator SIR in Figure 1 has a vectorial position in phase with the primary winding STC wih which it is situated in the same winding slots of the stator core. In Figure 1a this voltage is therefore represented by the vector EC for the co-axial position of the regulator, and by EC' for the position of displacement by $\alpha$. In the co-axial position where $\alpha=0$, EC has the vectorial position of the motor rotor voltage and will, therefore, either increase or decrease the speed level adjusted by the double induction regulator DIR (Figure 1).

Considering now the effect of the secondary voltage EC' when the rotor of the single induction regulator SIR is displaced by $\alpha$, there will be still retained the speed regulating component EC as the vector end of the voltage vector EC' lies on the locus LC.

There is now, however, in existence, a voltage component ECC which is at right angles to the motor rotor voltage, and which represents a leading voltage referred to the wattful component IW of the load current.

The arrangement, according to the invention, produces such leading voltage components, the amount of which is made to increase automatically with increasing rotor current, as will be seen from the further description of its function.

The compensating single induction regulator SIR develops on its shaft a torque which increases with increasing displacement angle. Its torque also increases with increasing current in its windings. As its secondary winding SC is introduced in the rotor circuit of the motor the torque is therefore directly dependent on the load of the motor.

The curves shown for a typical case in Figure 1b indicate, as a function of $$\tan \frac{\alpha}{2}$$

($\alpha$ being the displacement angle), the torque developed by the regulator SIR for load current in the rotor circuit of the motor M at zero, ¼, ½, ¾ and 1.0 of the full load current respectively.

As can be seen from the vector diagram Figure 1a, the compensating voltage ECC is proportional to $$\tan \frac{\alpha}{2}$$

so that the latter is a measure also of the compensating voltage.

The torque of the single induction regulator SIR tends to move its rotor back into the co-axial position, ($\alpha=0$), and is balanced in accordance with the invention by the torque of the rotary electromagnetic unit RM.

It will be readily seen that the torque developed by this unit RM is essentially proportional to its field excitation as its armature A is excited from the constant D. C. supply.

As the field excitation of FW of the unit RM is supplied from a rectifier RE which is connected in the secondary circuit of the current transformer CT, it is in its turn proportional to the current in the stator winding ST of the main motor M.

The horizontal straight lines in Figure 1b represent the torque of the rotary electromagnetic unit RM for ¼, ½, ¾ and 1.0 times the full load current respectively.

These torques are so applied as to operate in the direction for increasing the displacement angle. Stability will therefore be obtained at intersection points indicated by small circles in Figure 1b for the different loadings of the motor M. The compensating voltages obtained with the arrangement in this form increase with increased load of the motor M, but are not proportional to the load.

If proportionality is required an additional mechanical torque can be introduced by mechanical means of which the weighted lever L in Figure 1 is an example.

The additional torque obtained by the last mentioned mechanical means may be represented by the chain line in Figure 1b, and is introduced so as to add to the torque of the regulator SIR, the sum of the two torques being represented in Figure 1b by the dash lines relating respectively to the different ratings. The intersections indicated by small crosses of these dash lines with the horizontal straight lines which represent the torque of the rotary electromagnet unit RM, are now on an approximately straight line, resulting in compensating voltages proportional to the load current of the motor M.

In this way the compensating effect required to obtain the most favorable phase position of the rotor current of the motor M is produced under all loading conditions.

If there is no load current the natural restoring force of the induction regulator SIR will move the regulator into the central or coaxial position in which the variable voltage is zero. The compensating voltage will then also be zero so eliminating any leading magnetising current at no load, such leading magnetising current, as explained above, introducing difficulties requiring to be overcome in the known arrangements.

In Figure 1c an alternative arrangement for the excitation of the rotary electromagnetic unit RM is indicated.

In this alternative arrangement there are two field windings FW1 and FW2 which are respectively connected through rectifiers RE1 and RE2 to current transformers CTS and CTR in the stator and rotor circuits respectively of the motor M (not shown in Figure 1c). Under these conditions the torque of the rotary unit RM is dependent on both the stator and rotor current of the motor M having regard to the chosen relative excitation of the two field windings FW1 and FW2 of the unit RM and their feeding arrangements.

It will become clear that a number of other combinations can be adopted, and it is for instance possible to excite both the field system and the armature of the rotary electro-magnetic unit RM with load dependent currents if an increase of torque exceeding proportionality with the loading of the motor M is desired.

The arrangements as described are capable, therefore, of fully compensating the reactive voltage drop of the load current under all regimes of the motor M by the introduction of a leading voltage component ECC, Figure 1a, which is opposite in phase position and can be made equal to or even exceed the reactive voltage drop. In this way two objects are achieved.

The rotor current or the stator current of the A. C. commutator motor M or the average of these, can be reduced to the minimum required for developing the necessary torque of the motor.

This has the advantage of either reducing the required size of commutator and brushes to a minimum or of obtaining the lowest possible losses in the machine for all loading conditions and, at the same time, eliminating the influence of the reactive voltage drop on the speed regulation of the motor under varying loading.

This speed variation will, thereby, be essentially confined to the effect of the ohmic voltage drop, in the same way as with a D. C. machine where reactance plays no part in the behaviour of the machine, apart from transient conditions.

It is, moreover, possible to compensate for the ohmic voltage drop (IR drop compensation) as well by means of the arrangement according to the invention. This is achieved by introducing the load dependent variable voltage in a different vectorial direction from that indicated in Figure 1a.

If, for instance, this voltage is introduced in the direction shown by the dotted straight line LC' instead of in the direction of the locus LC, it will contain a speed increasing component ECS for a certain displacement angle in addition to ECC, the magnitude of the latter voltage being kept the same as before for the purpose of explanation.

The voltage component ECS may then be made such as to compensate the I. R. drop of the load current, resulting in a speed characteristic independent of the load, i. e. ideal "shunt" characteristic.

Conversely, such speed influencing load dependent voltage can be introduced in the opposite direction, thereby giving the motor a "compound" characteristic.

In the latter case the full compensating effect, as far as reactive voltage drop is concerned, can be retained with the favourable results described above, with regard to currents and minimum of losses.

In Figure 2 the same reference indications as in Figure 1 are used as far as is applicable to indicate corresponding parts.

In the arrangement illustrated by Figure 2 a single induction regulator IR of orthodox type is provided for obtaining the variable compensating voltage.

This induction regulator IR is mechanically coupled with an A. C. torque motor TM by shaft SH. The stator winding STM of the torque motor TM is fed from the secondary CTS of a 3-phase current transformer CTR, the primary CTP of which is connected in the rotor circuit of the commutator motor M.

To the coupling shaft SH is attached a mechanical, torque producing device which in this example consists, as shown schematically, of a lever L attached to the shaft, a weight W acting on the lever, and a spring SP connected at one end to the end of the lever and anchored at the other end to a convenient fixture, the spring acting in opposition to the weight. This torque producing device is to correct the torque balance of the induction regulator IR and the torque motor TM, if and as far as such correction is required in order to obtain a certain required compensating and/or speed adjusting effect.

The primary winding PC of the induction regulator IR is connected to the supply MS and its secondary winding SC is connected in the rotor circuit of the A. C. commutator motor M.

The torque developed by the torque motor TM is again dependent on the load of the commutator motor M, in this example expressed by the magnitude of the rotor current of said motor M. A displacement of the regulating arrangement, will, therefore, be obtained, the extent of such displacement depending on the load of the commutator motor M.

The vector diagram Figure 2a illustrates the result achieved with respect to the voltage introduced into the rotor circuit of the A. C. commutator motor M.

The same assumptions as applied to Figure 1a in regard to the vectorial position of the motor rotor voltage are made in connection with Figure 2a, while the primary winding PC of the single induction regulator IR is fed from the constant supply MS, the voltage in the secondary winding SC, represented by the vector ES in Figure 2a, is of constant magnitude and variable phase position, the locus of the vector ends being the circle shown in Figure 2a.

The induction regulator IR is so adjusted under no load conditions that its secondary voltage ES has a speed decreasing effect only.

At the displacement angle $\alpha$ for a given load current the secondary voltage has the phase position indicated by the vector ES', resulting in the introduction of a leading compensating voltage component ECC and a reduction of the speed decreasing voltage from ES to $$ESS = ES \times \cos \alpha$$

The arrangement if used in accordance with the vector diagram Figure 2a will, therefore, provide a combination of compensating and speed adjusting effects.

The relative amounts of these two effects can be changed by utilising other parts than as shown in Figure 2a of the circle representing the locus of the vector ends of ES and this can be brought about by choosing different zero positions of the vector ES for the no load condition of the motor M.

Generally, with the arrangements according to the invention, it is possible to have compensating voltages of certain magnitudes introduced under no load condition, if this is required. This is especially useful in combination with the measurement of stator current as exemplified by the arrangement according to Figure 1 which lends itself to an easy solution of obtaining power factor unity or thereabouts in the stator circuit of the commutator motor M.

It is, moreover, possible to shift the speed range for the motor M, obtained by means of the main regulator DIR, in Figures 1 and 2, as referred to the synchronous speed of the motor M by introducing downward and upward voltage components respectively in the rotor circuit of the motor, by the compensating regulating arrangements.

In all arrangements according to the invention it is possible to change the amount of compensating and speed adjusting effects. This may be desirable, for instance, by reason of the fact that smaller amounts of compensating voltage are required at higher speed levels of an A. C. commutator motor.

The adjustable resistance PO in Figure 1 can for this purpose be coupled to the main induction regulator DIR as indicated by the broken line so that the current in the armature circuit of the rotary electromagnetic unit RM changes as a function of the speed adjustment by the regulator DIR of the motor M.

Similar means can be introduced for instance in the field excitation circuit of the rotary electromagnetic unit RM, in the arrangement according to Figures 1 and 1c or can be used with the torque motor TM in Figure 2.

Such means are, however, omitted from the figures in order to avoid complication, and their application will be readily understood by those skilled in the art without necessitating illustration.

All known systems of double or single induction regulators, or other variable voltage transformer arrangements can be used.

Where, in use of such other forms of regulators there is either no restoring force, or one which is not suitable for the purpose of the invention, the mechanical means above referred to, can be adapted to produce the restoring torque required for a correct balance with the applied load-dependent torque under all regimes.

It will be realised that the range of the adjustment can also extend to the generative load range of the commutator machine.

Further effects can be obtained in the arrangements as described by the introduction, by transformer action, into the motor rotor circuit of a constant voltage to or from which the variable compensating voltage is added or subtracted, i. e. added algebraically.

The size of the compensating regulator can thereby be reduced, and/or the range of the variation of the resulting compensating voltage can be adjusted.

I claim:

1. An automatic control arrangement for a polyphase A. C. stator fed commutator machine, comprising a variable voltage transformer for speed control of said commutator machine, another variable voltage transformer for providing a compensating voltage component for said commutator machine, said variable voltage transformers having secondary windings included in the rotor circuit of said commutator machine, adjusting means for said variable voltage transformers, and an electromagnetic device operatively coupled mechanically to the adjusting means for said other variable voltage transformer, and energised by current responsive to a load current of said commutator machine, said electromagnetic device exerting a torque dependent on said load current and said secondary winding of said other variable voltage transformer producing a variable load-depending voltage component which has a vectorial position at right angles to the rotor voltage of the commutator machine, and is variable independently of the speed adjustment of said commutator machine, made by means of the first mentioned variable voltage transformer.

2. An automatic control arrangement for a polyphase A. C. stator fed commutator machine, comprising an induction regulator for speed control of said commutator machine, another induction regulator for producing a variable phase-shifting voltage which is dependent for its variation on the adjustment of said other induction regulator and is variable independently of the speed adjustment of said commutator machine made by means of the first mentioned induction regulator, said induction regulators having secondary windings included in the rotor circuit of said commutator machine, adjusting means for said induction regulators, and an electromagnetic device operatively coupled, mechanically, to the adjusting means for said other induction regulator and energised by current dependent on a load current of said commutator machine, so that adjustment of said other induction regulator is dependent on the interaction between the inherent torque of said other induction regulator and a load dependent torque exerted by said electro-magnetic device.

3. An automatic control arrangement for a polyphase A. C. stator fed commutator machine, comprising a variable voltage transformer for speed control of said commutator machine, another variable voltage transformer for producing a variable phase-shifting voltage which is dependent for its variation on the adjustment of said other variable voltage transformer and is variable independently of the speed adjustment of said commutator machine made by means of the first mentioned variable voltage transformer, said variable voltage transformers having secondary windings included in the rotor circuit of said commutator machine, adjusting means for said variable voltage transformers, an electro-magnetic device operatively coupled, mechanically, to the adjusting means for said other variable voltage transformer and energised by current dependent on a load current of said commutator machine, to produce a load-dependent torque which is applied to said other variable voltage transformer and mechanical means operatively connected to said adjusting means for said other variable voltage transformer, for producing an opposing torque of a magnitude dependent on the adjustment of said other variable voltage transformer, to obtain equilibrium of torques under varying conditions of loading of said commutator machine.

4. An automatic control arrangement for a polyphase A. C. stator fed commutator machine, comprising an induction regulator having its secondary winding included in the rotor circuit of said commutator machine, for speed control of said commutator machine, another induction regulator having a secondary winding which is included in the rotor circuit of said commutator machine for producing a compensating voltage, which is variable independently of the speed adjustment of said commutator machine, made by means of the first mentioned induction regulator, adjusting means for said induction regulators, a rotary electromagnetic device operatively coupled, mechanically, to the adjusting means for said other induction regulator for applying a balancing torque to said other induction regulator, said rotary electromagnetic device comprising a wound field magnet system and a wound armature, and means for feeding said rotary electromagnetic device with direct currents proportional to loading currents of said commutator machine, to render said balancing torque a load-depending torque.

5. An automatic control arrangement for a polyphase A. C. stator fed commutator machine comprising an induction regulator having its secondary winding included in the rotor circuit of said commutator machine, for speed control of said commutator machine, another induction regulator having a secondary winding which is included in the rotor circuit of said commutator machine for producing a compensating voltage which is variable independently of the speed adjustment of said commutator machine, made by means of the first mentioned induction regulator, adjusting means for said induction regulators, a rotary electromagnetic device operatively coupled, mechanically, to the adjusting means for said other induction regulator for applying a balancing torque to said other induction regulator, said rotary electromagnetic device comprising a wound field magnet unit and a wound armature unit, means for feeding one of said units with direct currents proportional to loading currents of said commutator machine, and means for feeding the other of said units with a regulatable supply of direct current from an independent direct current supply.

6. An automatic control arrangement for a polyphase A. C. stator fed commutator motor, comprising a main induction regulator having a secondary winding connected to the commutator brushes of the commutator motor to be controlled, for speed control of said motor, an auxiliary induction regulator having a secondary winding which is included in the rotor circuit of said commutator motor for producing a compensating voltage which is variable independently of the speed adjustment of said commutator machine, made by means of the main induction regulator, adjusting means for said auxiliary induction regulator, a rotary electromagnetic device operatively coupled, mechanically, to said adjusting means for applying a load dependent torque to said auxiliary induction regulator, said rotary electromagnetic device comprising a wound field magnet unit and a wound armature unit, means for feeding said electromagnetic device with direct currents proportional to loading currents of said commutator motor, including a resistance regulator, said resistance regulator being included in a feed circuit of said electromagnetic device and having an operative mechanical connection with said main induction regulator to render the torque applied by said electromagnetic device to said auxiliary induction regulator responsive to the speed adjustment of said commutator motor as determined by said main induction regulator.

7. An automatic control arrangement for a polyphase A. C. stator fed commutator machine, comprising an induction regulator having its secondary winding included in the rotor circuit of said commutator machine for speed control of said commutator machine, another induction regulator having a secondary winding which is included in the rotor circuit of said commutator machine, for producing a phase shifting voltage which is dependent for its variation on the adjustment of said other induction regulator, and is variable independently of the speed adjustment of said commutator machine made by means of the first mentioned induction regulator adjusting means for said induction regulators, an A. C. torque motor operatively coupled, mechanically, to the adjusting means for said other induction regulator to exert a torque on said other induction regulator, and means for feeding said torque motor with current dependent on the loading of said commutator motor to render said torque load-dependent.

8. An automatic control arrangement for a polyphase A. C. stator fed commutator machine, comprising an induction regulator having its secondary winding included in the rotor circuit of said commutator machine for speed control of said commutator machine, another induction regulator of the single core type having a stator provided with a primary winding and a rotor also provided with a primary winding, said primary windings being connected together and one of them being connected to the supply, a secondary winding provided in said other induction regulator to produce a variable phase shifting voltage which is dependent for its variation on the adjustment of said other induction regulator, and is variable independently of the speed adjustment of said commutator machine, made by means of the first mentioned induction regulator, said secondary winding being connected in the rotor circuit of said commutator motor, adjusting means for said induction regulators, and a rotary electromagnetic device operatively coupled, mechanically to the adjusting means of said other induction regulator and fed with current dependent on the load, to exert a load-depending torque on said other induction regulator.

9. An automatic control arrangement for a polyphase A. C. stator fed commutator machine, comprising an induction regulator for speed control of said commutator machine said induction regulator having its primary winding connected to the supply and its secondary winding connected in the rotor circuit of said commutator machine, another induction regulator of the single core type having in one of its parts a primary winding, which is connected to the supply, and in the other of its parts a secondary winding which is connected in the rotor circuit of the commutator machine to produce a phase shifting voltage dependent for its variation on the adjustment of said other induction regulator and variable independently of the speed adjustment of said commutator machine, made by means of the first mentioned induction regulator, adjusting means for said induction regulators, a rotary electromagnetic device operatively coupled, mechanically, to the adjusting means for said other induction regulator to exert a torque on said other induction regulator and means for feeding said rotary electromagnetic device with current dependent on load currents of the commutator machine, to render said torque load-dependent.

10. An automatic control arrangement for a polyphase A. C. stator fed commutator machine, comprising an induction regulator having its secondary winding included in the rotor circuit of said commutator machine for speed control of said commutator machine, another induction regulator having a secondary winding which is included in the rotor circuit of said commutator machine for producing a phase shifting voltage which is dependent for its variation on the adjustment of said other induction regulation and is variable independently of the speed adjustment of said commutator machine, made by means of the first mentioned induction regulator, adjusting means for said induction regulators, a rotary electro-magnetic device operatively coupled, mechanically, to the adjusting means for said other induction regulator to exert a torque on said other induction regulator, means for feeding said rotary electro-magnetic device with currents dependent on load currents of said commutator machine, to render said torque load-dependent, and transformer means for introducing into the rotor circuit of said commutator machine a constant voltage to which said variable voltage is added algebraically.

11. An automatic control arrangement for a polyphase A. C. stator fed motor comprising a main double core induction regulator having primary windings connected to the supply and secondary windings connected to the commutator brushes of the commutator motor to be controlled, for speed control of said motor, another induction regulator of the single core type having primary windings in its stator and rotor, said primary windings being connected together and one of them being connected to the supply, said single core induction regulator also having a secondary winding in its stator to produce a phase shifting voltage dependent on the adjustment of said single core induction regulator and variable independently of the speed adjustment of said commutator machine, made by means of said main double core induction regulator, said secondary winding being connected in the rotor circuit of said commutator motor, adjusting means for said single core induction regulator, a rotary electromagnetic device operatively coupled, mechanically, to said adjusting means, said rotary electromagnetic device comprising a wound field magnet assembly and a wound armature, the winding of said armature being fed with direct current from an independent source of direct current supply, and means for feeding the windings of said field magnet assembly with direct current dependent on the load current of said commutator motor to cause said rotary electromagnetic device to exert a torque on said single core induction regulator dependent on said load current, said feeding means comprising a rectifier and a current transformer having its primary included in the stator circuit of said commutator motor and its secondary connected to said rectifier.

12. An automatic control arrangement for a polyphase A. C. stator fed commutator motor comprising a main double core induction regulator having primary windings connected to the supply and secondary windings connected to the commutator brushes of the commutator motor to be controlled, for speed control of said motor, another induction regulator of the single core type having a primary winding connected to the supply and a secondary winding connected in the rotor circuit of said commutator motor to produce a phase shifting voltage dependent for its variation on the adjustment of said single core induction regulator and variable independently of the speed adjustment of said commutator machine, made by means of said main double core induction regulator, means for adjusting said single core induction regulator, a torque motor operatively coupled, mechanically, to said adjusting means, to exert a torque on said single core induction regulator, and a current transformer, said transformer having its primary winding connected in the rotor circuit of said commutator motor and its secondary winding connected to the stator winding of said torque motor to render the torque exerted by said torque motor on said single core induction regulator a load-dependent torque.

13. An automatic control arrangement for a polyphase A. C. stator fed commutator machine comprising a variable voltage transformer for speed control of said commutator machine, another variable voltage transformer, said variable voltage transformers having their secondary windings connected in the rotor circuit of said commutator machine, adjusting means for said variable voltage transformers, and an electromagnetic device operatively coupled, mechanically, to the adjusting means for said other variable voltage transformer and energised by current dependent on a load current of said commutator machine, said electromagnetic device exerting a torque dependent on said load current, and said secondary winding of said other variable voltage transformer producing a load-depending voltage variable independently of the speed adjustment of said commutator machine, made by means of the first mentioned variable voltage transformer said variable voltage comprising a voltage component having a vectorial position coinciding with the vectorial position of the rotor voltage of the commutator machine for exercising a load-depending influence on the speed of said commutator machine, in addition to a voltage component vectorially at right angles to said rotor voltage.

BENNO SCHWARZ.

REFERENCES CITED

The following references are of record in the file of this patent:

UNITED STATES PATENTS

| Number | Name | Date |
| --- | --- | --- |
| 839,935 | Lamme | Jan. 1, 1907 |
| 974,433 | Renshaw | Nov. 1, 1910 |
| 1,658,662 | Welsch | Feb. 7, 1928 |
| 2,137,877 | Kramer | Nov. 22, 1938 |
| 2,192,050 | Norcross | Feb. 27, 1940 |